United States Patent
McCarrick et al.

[11] Patent Number: 5,953,682
[45] Date of Patent: Sep. 14, 1999

[54] AUTOMATED GAS CYLINDER TRACKING SYSTEM

[75] Inventors: Henry J. McCarrick, Fallbrook; William T. Leyden, III, Laguna Hills; Khanh H. Tran, Laguna Niguel; John F. Jordon, III, Solana Beach; Kevin C. Ross, San Clemente, all of Calif.

[73] Assignee: Millipore Corporation, Bedford, Mass.

[21] Appl. No.: 08/802,168

[22] Filed: Feb. 14, 1997

[51] Int. Cl.$^6$ ............... F17C 13/02; G01F 13/00
[52] U.S. Cl. .................. 702/45; 702/47; 702/51; 702/55; 364/528.16; 364/528.1; 705/22; 705/28; 340/632; 340/626; 340/612; 340/825.06; 340/825.15; 340/825.5; 235/385; 235/441; 235/375; 40/306
[58] Field of Search .................. 702/45, 47, 50, 702/51, 55; 364/528.17, 528.16; 705/22, 28, 17, 21, 23; 235/385, 441, 485, 375; 40/306, 665, 666, 307, 310; 340/501, 506, 532, 612–614, 626, 632, 825.06, 825.15, 825.31, 825.5

[56] References Cited

U.S. PATENT DOCUMENTS

| | | | |
|---|---|---|---|
| D. 367,431 | 2/1966 | Omuru et al. | D10/78 |
| D. 390,111 | 2/1998 | McCarrick et al. | D9/434 |
| D. 390,139 | 2/1998 | McCarrick et al. | D10/78 |
| 3,102,508 | 9/1963 | Smith, Jr. | 411/437 X |
| 3,239,113 | 3/1966 | Knize | D9/447 X |
| 4,653,781 | 3/1987 | Sheets et al. | 285/319 |
| 4,827,643 | 5/1989 | Hearst et al. | 40/306 |
| 4,944,536 | 7/1990 | Bartholomew | 285/319 |
| 4,989,160 | 1/1991 | Garrett et al. | 364/528.17 |
| 5,155,481 | 10/1992 | Brennan, Jr. et al. | 340/870.02 |
| 5,195,860 | 3/1993 | Steyn | 411/526 |
| 5,322,992 | 6/1994 | Castleman et al. | 235/492 |
| 5,440,477 | 8/1995 | Rohrberg et al. | 364/188 |
| 5,517,015 | 5/1996 | Curry et al. | 235/492 |
| 5,539,188 | 7/1996 | Fallah et al. | 235/375 |
| 5,555,655 | 9/1996 | Yager et al. | 40/306 |
| 5,634,032 | 5/1997 | Haddock | 395/439 |
| 5,697,173 | 12/1997 | McCarrick et al. | 40/310 |
| 5,713,692 | 2/1998 | McCarrick et al. | 403/329 |

FOREIGN PATENT DOCUMENTS 2238083  2/1975  France ................. 411/527

OTHER PUBLICATIONS

Dallas Semiconductor Corporation, "Semiconductor memory chips/Touch Memory chips", pp. 1–72, Feb. 1994.

*Primary Examiner*—Tariq R. Hafiz
*Assistant Examiner*—Tuan Q. Dam
*Attorney, Agent, or Firm*—Daniel F. Perez; Gardere & Wynne, LLP

[57] ABSTRACT

An automated gas cylinder monitoring system includes: a data storage collar associated with a gas cylinder including a resident memory and an insulated housing, the insulated housing being configured for coupling with a gas cylinder; a read/write probe for writing data to and receiving data from the resident memory of said data storage collar; measuring devices for determining the volume of gas in a gas cylinder; and a host computer for transmitting information to and receiving information from the read/write probe.

20 Claims, 7 Drawing Sheets

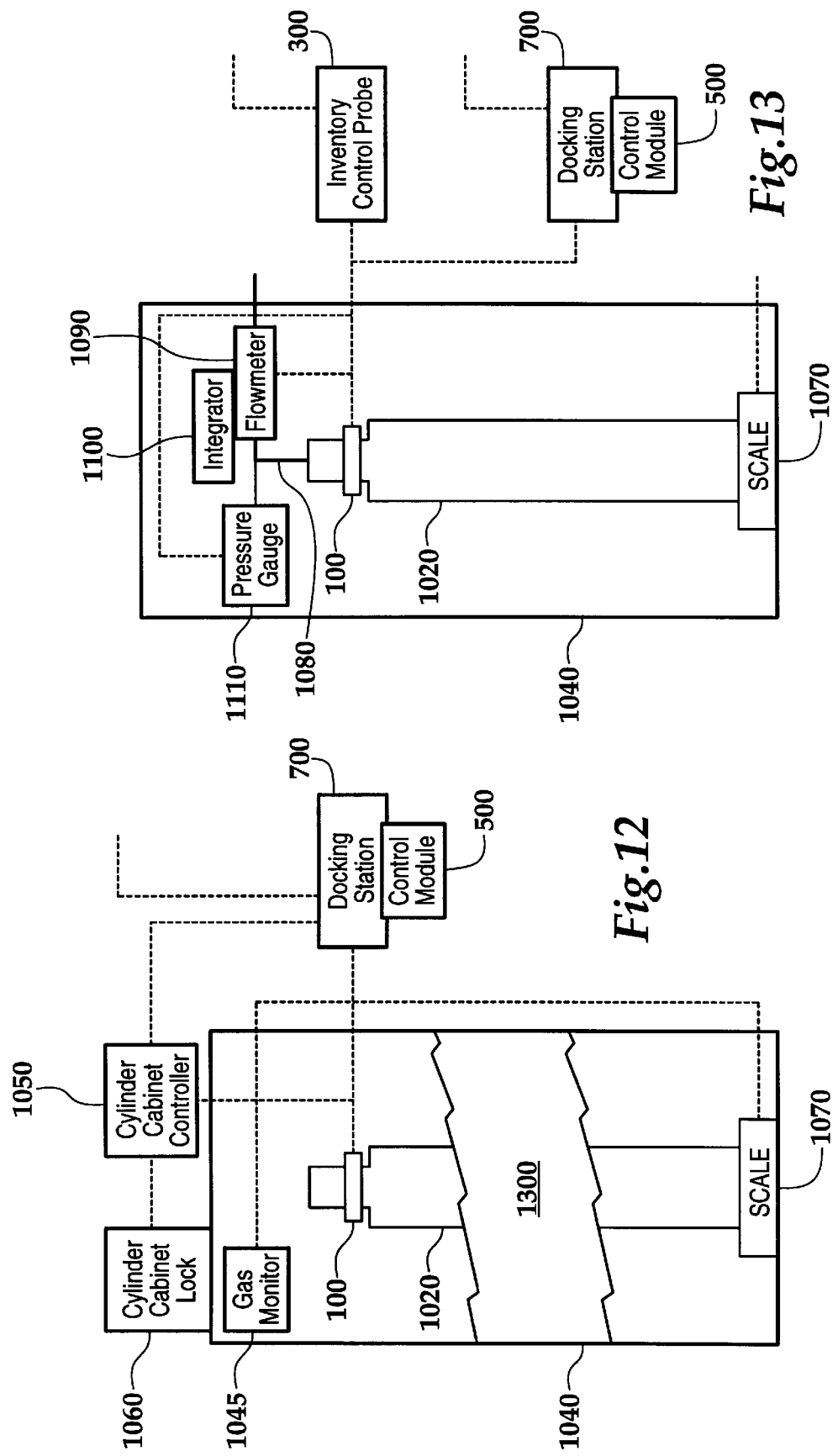

AUTOMATED GAS CYLINDER TRACKING SYSTEM

TECHNICAL FIELD

The present invention relates to a computerized gas cylinder monitoring system and a process for monitoring gas cylinders.

BACKGROUND OF THE INVENTION

A wide variety of industrial operations require the use of various process gases. In some of these operations, the process gases may be purchased and/or stored in bulk quantities and supplied via a direct pipeline from the producer. In many cases, however, the quantity of gas required does not warrant purchasing or storing the gases in bulk quantities. In other cases, the gases may not be available in bulk quantities.

When it is not desirable to purchase process gases in bulk quantities, or when a particular gas is not available in bulk quantities, the gas is typically supplied in a pressurized cylinder or tank. As used herein, the term "gas cylinder" includes cylinders and tanks used to store liquified gases and gases absorbed or contained in media inside the cylinder or tank as well as cylinders or tanks used to store material in the gas phase. Such cylinders or tanks can range in size from 5.0 Kg. to 500 Kg. and larger. In some applications a number of different process gases will be supplied in cylinders and these cylinders will be placed at various locations in the manufacturing facility. For example, in the semiconductor fabrication industry, a variety of process gases used for different process steps are typically supplied in cylinders.

In order to control costs, it is desirable to maintain on hand only the am6unt of raw materials, including process gases, necessary to insure continuity of operations. On the other hand, unplanned process shutdowns or interruptions resulting from depletion of required raw materials can be extremely costly and detrimental to operations. Thus, there is a need for an improved system to maintain inventory control over process gases supplied in cylinders.

Additionally, many process gases are toxic, flammable or incompatible with other raw materials. In such cases it is desirable to insure that only the correct process gas is utilized in a given process step. Thus there is a need for an improved gas cylinder monitoring system that has the capability of preventing a cylinder containing the wrong gas from being utilized in a particular process step.

SUMMARY OF THE INVENTION

The present invention provides an automated gas cylinder monitoring system. The invention includes data storage devices associated with individual gas cylinders, data read/write devices for writing data to, and reading data from, the gas cylinder data storage device and a host computer. Data collected from the gas cylinder data storage devices may be input into the host computer for tracking and reporting purposes.

In one embodiment of the invention, the data storage device associated with an individual cylinder comprises an inventory control collar placed on the neck of a gas storage cylinder or tank. A pressure gauge for monitoring the pressure in the cylinder may be included as part of the data storage device. The inventory control collar includes a resident memory that is capable of storing such general inventory control information as a collar identification number, container serial number, owner name and site, product code, product material, DOT hazard classification, content fill level, tare weight, content level during use, fill site and date, and shelf life. Shipping information that may also be stored includes origin point (including company name, site and code), shipping manifest number, shipping date, destination point (including company name and site), destination order number and product, destination receiving date and by whom received. Transfer information may also be stored and include the transfer point (including company name and site), manifest number, destination point (including company name and site), order number, destination receiving data and by whom received. Further, certification data may be stored and include record number, certifier, analysis and specification limits. The resident memory may also be used to record additional manufacturing information such as upset conditions, process steps and operator notations. All of the above listed information is not necessarily stored in the resident memory of the inventory control collar. It may be desirable in some cases to store certain information in the host computer.

BRIEF DESCRIPTION OF THE DRAWINGS

A more complete understanding of the present invention may be had by reference to the following Detailed Description when taken in conjunction with the accompanying drawings wherein like reference characters denote like or similar parts throughout the figures:

FIG. 12 is a partial cut-away view of a gas cylinder positioned inside a cylinder cabinet utilizing the interlock feature of the present invention; and FIG. 13 is a front view of a gas cylinder positioned inside a cylinder cabinet including a gas monitor, a flowmeter, a data read/write device, a pressure gauge and wherein the cylinder is positioned on top of a scale connected to a data read/write device.

DETAILED DESCRIPTION OF THE DRAWINGS

Figure 1:
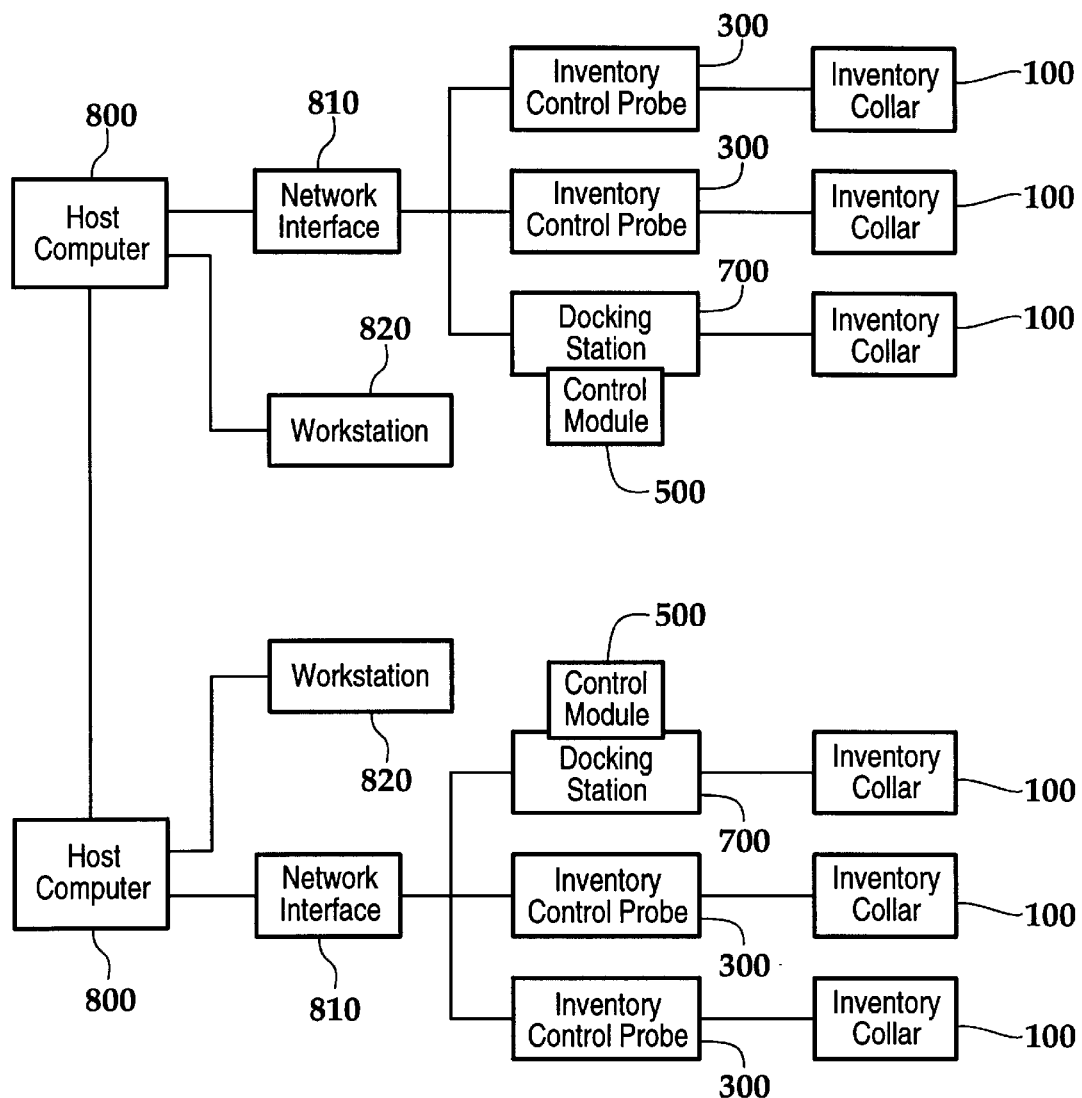
FIG. 1 is schematic diagram illustrating the general configuration of the automated gas cylinder monitoring system of the present invention.

As described in greater detail below, in one embodiment of the invention, the data read/write device used with the inventory control collar comprises an inventory control collar probe. The probe is placed in contact with an inventory control collar (data read/write device) to read data from, and write data to the collar. In this embodiment of the invention, two circumferential probe conductor rings are imbedded in the inventory control collar and exposed on the upper surface of the collar.

More specifically, the inventory control collar includes a first conductive ring exposed on the top of the collar electrically connected to a memory, and a second conductive ring exposed on the top of the collar that is also electrically connected to the memory.

The inventory control probe includes a probe tip and a first pair of terminal contacts on the probe tip for simultaneously contacting the conductive rings of the inventory control collar. The probe also includes a body housing movably connected at a first end to the probe tip, a pair of data transfer terminal contacts located on a bottom portion of the body housing and a handle housing connected at a second end to the probe body housing.

Data read and written to the inventory control collar is stored in the memory of the inventory control probe until it is downloaded to a host computer system or used to perform an independent action based on a programmed response. For example, inventory items may be accepted or rejected at a particular location based on user defined criteria such as gas type or quality.

Alternatively, in still another embodiment of the invention, the data read/write device used with the inventory control collar comprises an inventory control docking station and control module for reading and writing data to and from an inventory control collar. The inventory control docking station includes a probe tip and a first pair of terminal contacts on the probe tip for simultaneously contacting the conductive rings of the inventory control collar.

The docking station also includes a docking station housing connected by an electrical conductor to the probe tip housing and a pair of data transfer terminal contacts disposed on the docking station body housing for providing a transmission link to an inventory control module.

The inventory control module for reading and writing data to and from the inventory control docking station includes a control module housing, a pair of data transfer terminal contacts for contacting the data transfer terminal contacts on the docking station microprocessor and a memory.

The present invention, in a further embodiment, incorporates an interlock system for preventing the inadvertent connection of a cylinder of the wrong gas at a particular location in the process. In this embodiment, gas cylinders are stored in enclosures such as cabinets. The cabinets are equipped with data read/write devices connected to a controller on each cabinet which locks the cabinet. The read/write devices and/or the cabinet controller is preprogrammed to accept only a particular type of gas. Alternatively, the read/write device may be connected to a host computer which has been preprogrammed to allow access to the cabinet only after it has been confirmed that the gas cylinder to be loaded contains the correct gas.

When a gas cylinder is to be loaded into the cabinet, the data read/write device is used to read the information stored on the gas cylinder data storage device associated with the particular cylinder, including the particular type of gas stored in the cylinder. If the cylinder does not contain the correct gas, the cabinet controller will not unlock the cabinet. Thus, the gas cylinder monitoring system of the present invention also provides desirable safety features.

In some applications the consumption rate of a given process gas is constant and predictable based on the throughput of the process or other factors. In these cases, the cylinder replacement cycle may be predicted based upon historical data. However, in other cases, the rate of gas consumption may be variable, requiring monitoring of flow rate, cylinder pressure or cylinder weight in order to avoid depleting the supply of process gas and shutting down the operation. In such cases it is desirable to provide for remote monitoring of the gas cylinder in order to prevent unplanned shutdowns and reduce the need for operator monitoring.

Therefore, in one embodiment of the present invention, process gas cylinders are mounted or positioned on scales and/or equipped with flow gauges or pressure gauges. Output signals from the scales or gauges are input into data read/write devices for transmission to a host computer for monitoring.

Thus, the present invention can be used for inventory management, raw materials tracking, and to prevent downtime associated with running out of a particular process gas. The inventory control system may also be utilized to provide an interlock to prevent a cylinder of the wrong type of gas from being installed at particular location. Further, the host computer of the automated gas cylinder monitoring system of the present invention is programmed to calculate and display a cylinder replacement schedule based on information transmitted to the host computer from the read/write device.

Referring now to FIG. 1, the automated gas cylinder monitoring system of the present invention is schematically illustrated. A plurality of inventory control collars 100 are accessed with inventory control probes 300 for transmission of data to or from the inventory control collars 100. The inventory control probes 300 are, in turn accessed by a host computer 800, either directly or through a local area network interface 810. Alternatively, the inventory control collars may be accessed through the use of a control module 500 and docking station 700.

Information regarding a particular cylinder may be retrieved and displayed on one or more workstations 820. For example, the location and contents of a particular cylinder may be retrieved and displayed. The host computer 800 may also be interfaced with one or more additional host computers 800' at remote locations, for example, at a suppliers facility.

Figure 2:
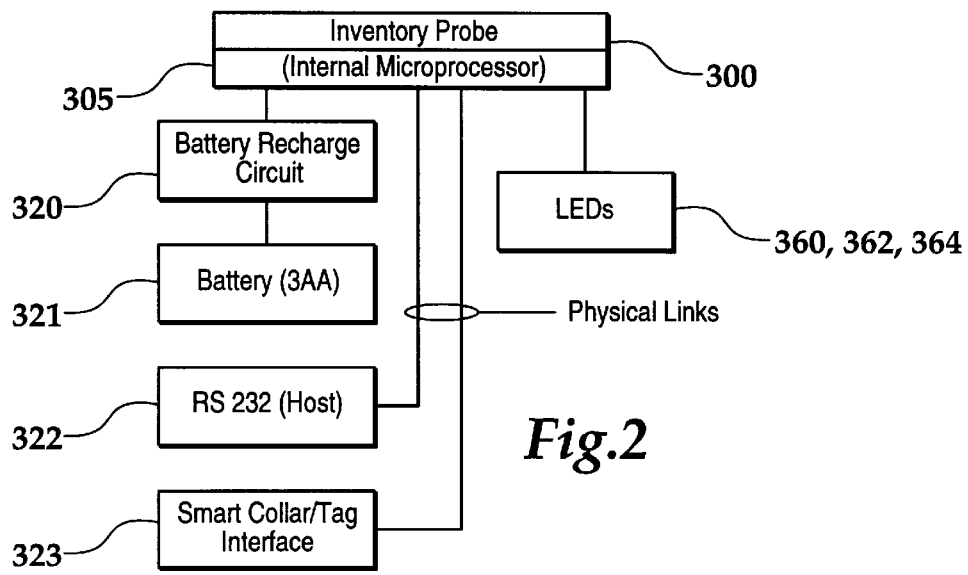
FIG. 2 is a block diagram of the circuity for an inventory control probe (data read/write device) of the present invention.

Referring to FIG. 2, there is shown a block diagram for the inventory control probe 300. The inventory control probe 300 includes a internal micro-processor 305, battery recharge circuit 320 and battery 321. The micro-processor contains both read only memory (ROM) and random access memory (RAM), for example a 32K ROM and a 32K RAM. The inventory control probe 300 further includes an RS232 terminal 322 as an interface to a transmission link to a host computer and terminal 323 as an interface to a transmission link to a smart collar 100 or a smart tag.

Figure 3:
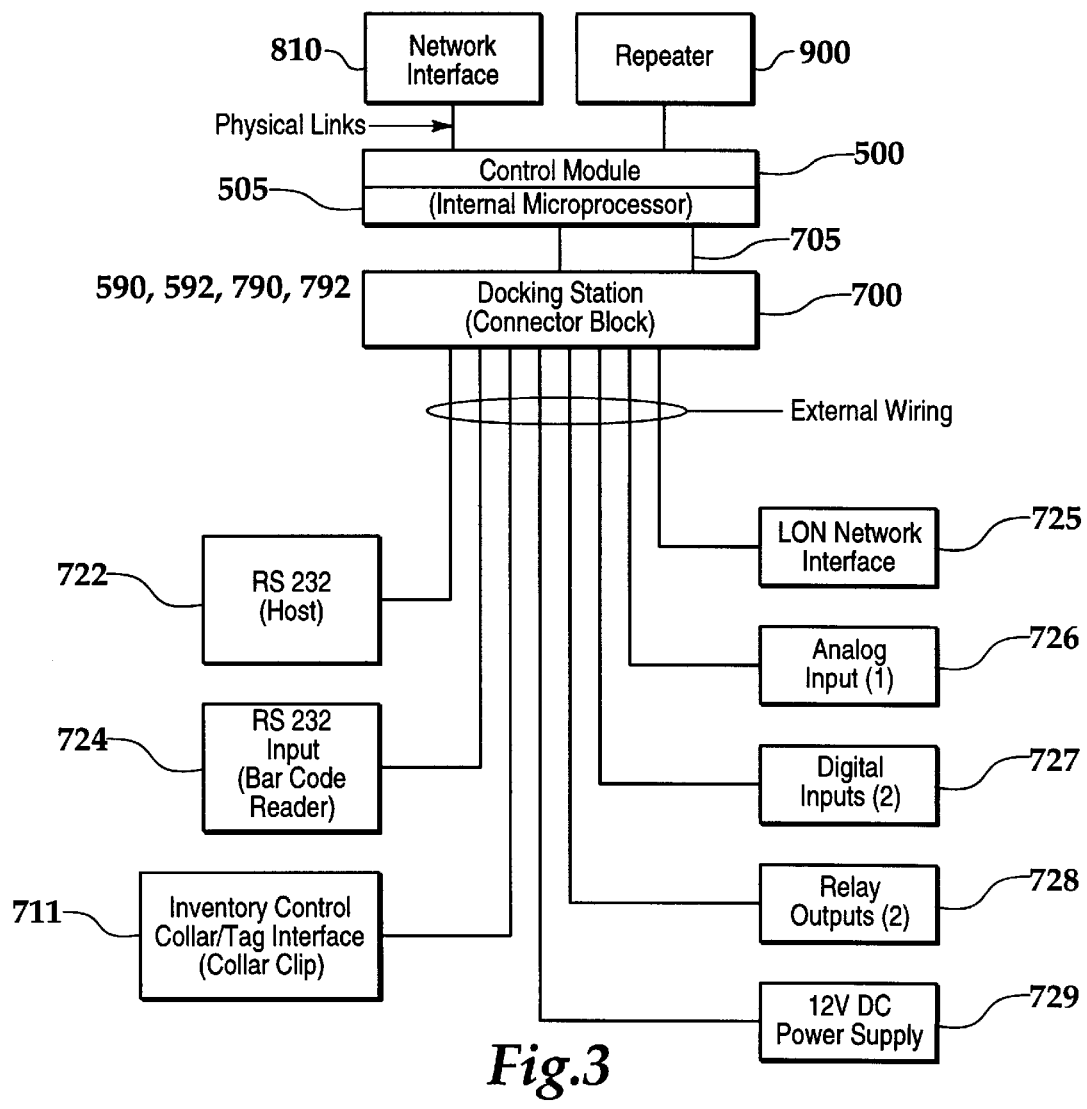
FIG. 3 is a block diagram of a control module and the docking station of the present invention.

Referring now to FIG. 3, there is shown a block diagram for control module 500 and docking station 700. The control module 500 includes an internal micro-processor 505 with, for example, 32K ROM and 32K RAM. The control module 500 further includes terminals as an interface to a transmission link to the network interface 810 and a repeater 900 for amplifying transmitted or received signals. The control module 500 also includes terminals as an interface to a transmission link 590 to the docking station 700 via docking station terminals 705. The docking station 700 includes an RS232 terminal 722 as a transmission link for data transmission to and from a host computer and an interface network 711 as a transmission link to an inventory control collar 100 or a smart tag. As illustrated, the docking station 700 also includes transmission links 724, 725, 726, 727, 728 and 729 for an input bar code reader, (not shown) one or more LEDs, first and second analog inputs, a relay output, and a power supply, respectively.

Figure 4:
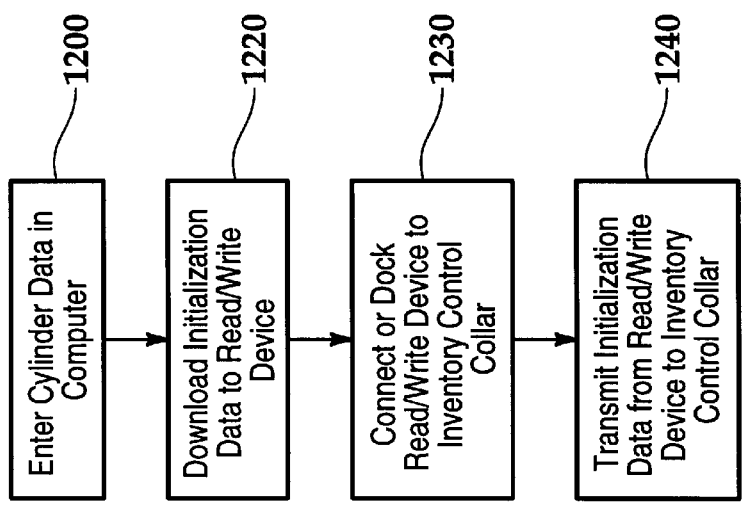
FIG. 4 is a flow chart illustrating the initialization of an inventory control collar (data storage device) of the present invention.

Referring now to FIG. 4, there is illustrated by means of a flow diagram the operation of the automated gas cylinder monitoring system of the present invention. When an inventory control collar (FIGS. 6 and 6A) is placed into service it is first initialized, i.e., certain information recorded in the memory of the collar. Additionally, a record or file for the collar is created and stored in the host computer 800. The information required to create a record of an inventory control collar and to initialize the collar is first entered into the host computer (step 1200).

Information used to create a record of the inventory control collar in a host computer and to initialize the collar may include: the collar identification number, container serial number, owner name and site, current location, product code, product material, DOT hazard classification, content fill level, tare weight, content level during use, fill site and date, and shelf life.

Additional information that may be used to initialize an inventory control collar includes the origin point of the cylinder, manifest number, shipping date, destination, destination order number and product, destination receiving date and by whom received. Certification data may also be recorded in the inventory control collar's resident memory, including analysis and specification limits.

Figure 10:
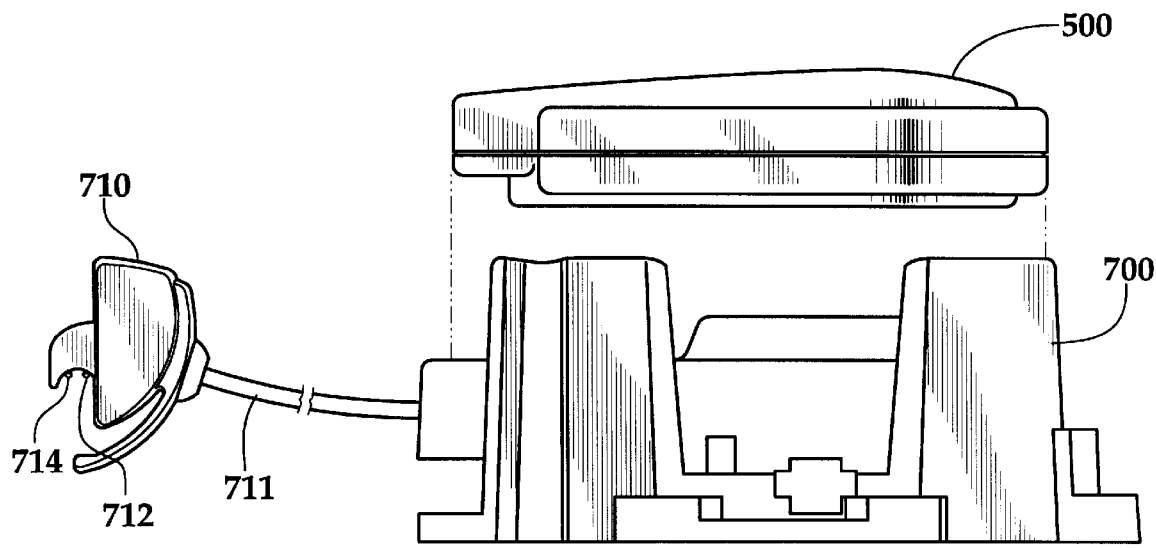
FIG. 10 is a side view of the control module and docking station.
Figure 11:
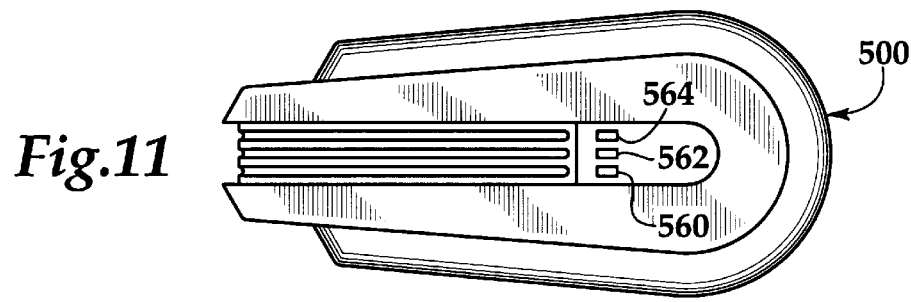
FIG. 11 is a top view of a control module of the present invention used in an inventory control system.

After the desired information is entered into the host computer 800, the information required for initialization of the collar is downloaded to the data read/write device (step 1220). As disclosed above, the data read/write device comprises the inventory control probe 300 (FIGS. 7–9) or the docking station 700 with a control module 500 (FIGS. 10 and 11). The inventory control probe 300 or control module 500 is then connected or docked (step 1230) to the inventory control collar and the initialization information is transmitted (step 1240) to the resident memory 200 (FIG. 6A) of the inventory control collar. If the inventory control collar has not been installed on the cylinder, it is then installed and the cylinder may be placed in storage or into service.

Figure 5:
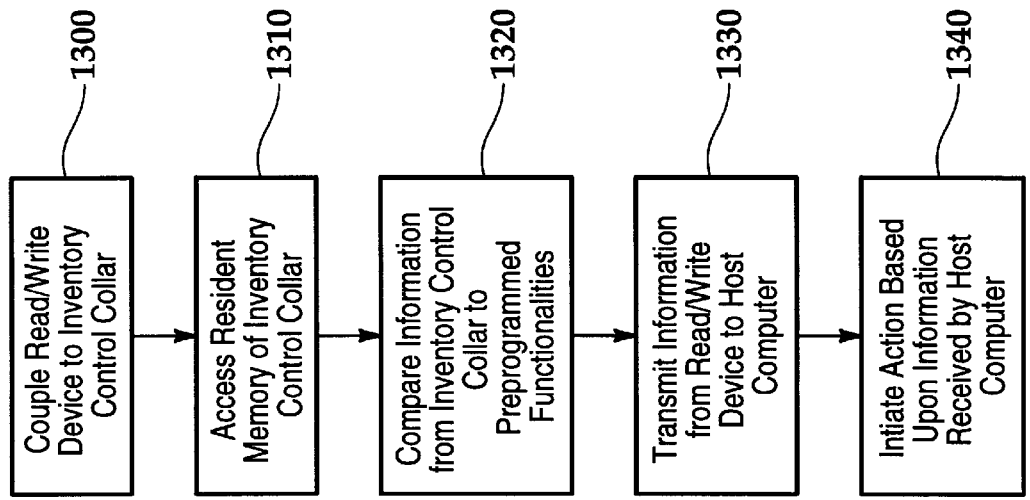
FIG. 5 is a flow chart illustrating the operation of the automated gas cylinder monitoring system of the present invention.

Turning now to FIG. 5, the operation of the gas cylinder monitoring system of the present invention is further illustrated. A data read/write device comprising an inventory control probe 300 or a docking station 700 with a control module 500 is coupled to an inventory control collar associated with a particular gas cylinder (step 1300). The data read/write device accesses the resident memory of the inventory control collar (step 1310) and records information stored in the memory. The information retrieved from the inventory control collar 100 may include the cylinder weight, cylinder pressure, the flow rate of the gas exiting the cylinder and/or the total flow from the cylinder over a preselect period of time or the supply cycle of the cylinder. The information stored in the resident memory of the inventory control collar 100 may also include the date when the cylinder was last filled, the date when the cylinder was placed into service, the date when the collar was last accessed by a read/write device, the shelf life expiration date of the material in the cylinder and the anticipated date upon which the cylinder will require replacement or refilling. After the information has been recorded by the read/write device, the device compares the recorded values to preprogrammed functionalities stored in the read/write device (step 1320). For example, in the case of a cylinder replacement, the read/write device compares the product data from the inventory control collar 100 with preprogrammed data associated with the particular cylinder enclosure to insure that a cylinder contains the correct type of process gas.

Alternatively, the host computer 800 controls the operation of the particular cylinder enclosure based upon data transmitted to the host computer from the read/write device.

After the read/write device has compared the recorded values to any preprogrammed functionalities stored in the device, the recorded values are transmitted to the host computer 800, either directly or via a network interface (step 1330). Based upon the data received from the read/write device, the host computer initiates a number of different actions during step 1340 including, but not limited to, scheduling a cylinder for replacement or refilling, ordering a new cylinder, generating a cylinder replacement schedule based upon the information received, transmitting an alarm in the event that process parameters have exceeded predetermined limits or directing that a cylinder be retrieved from storage for anticipated replacement (step 1340).

Figure 6:
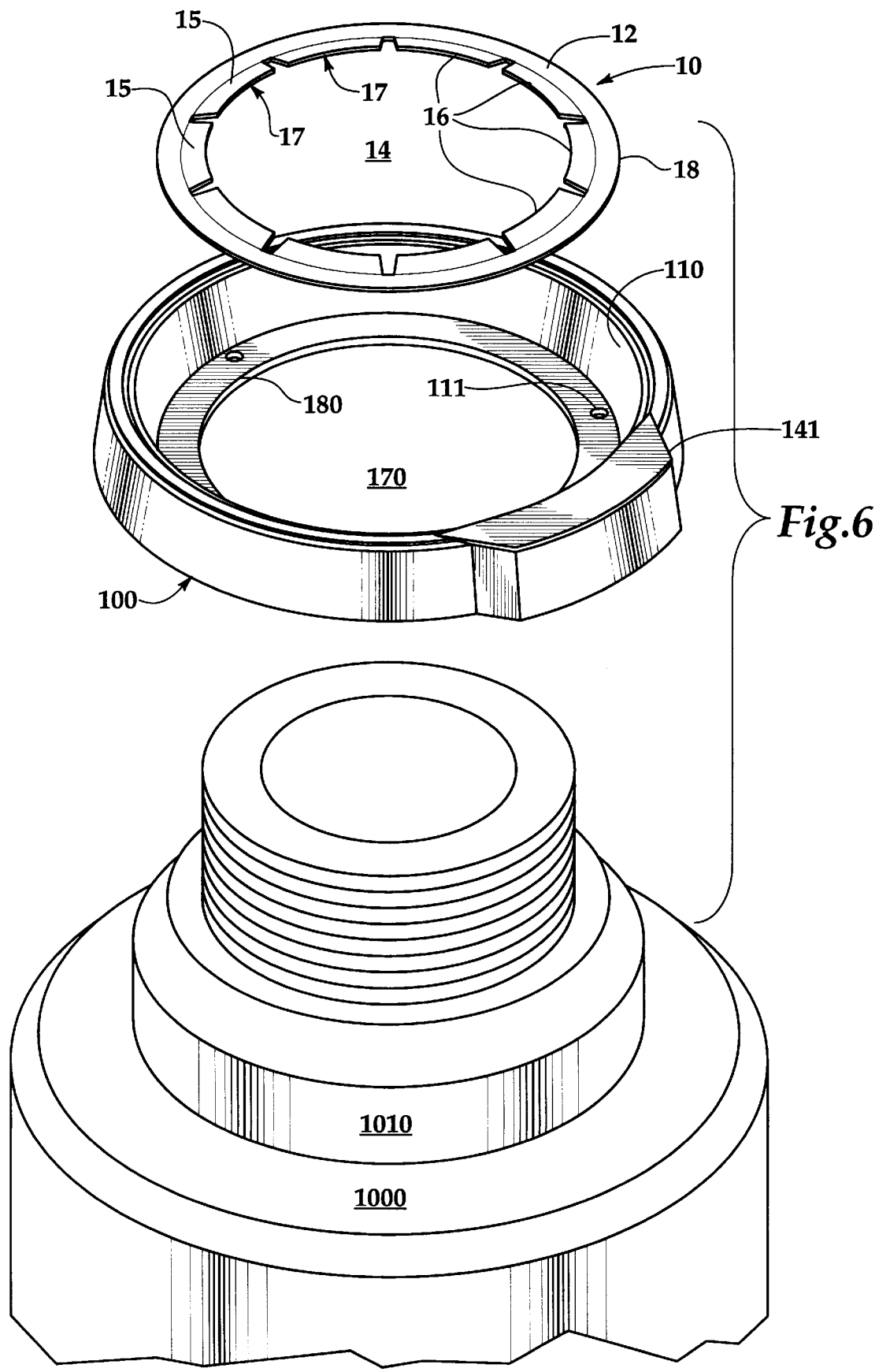
FIG. 6 is an exploded perspective view illustrating an inventory control collar (data storage device) and inventory control locking ring used with a storage container.
Figure 6A:
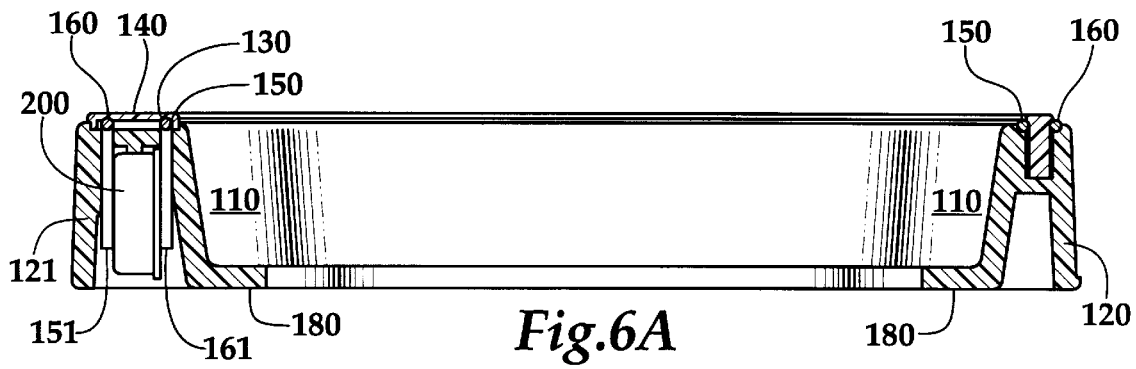
FIG. 6A is a cross section view of the inventory control collar used in an embodiment of the present invention.

Referring now to FIGS. 6 and 6A, the inventory control collar 100 (data storage device) includes a generally circumferential housing 120 defining a central opening 170 for receiving the neck 1010 of a gas cylinder 1000. The housing 120 includes a bottom ledge 180 projecting inwardly into the central opening 170.

An inventory control collar locking ring 10 seats into a depression 110 in the collar and rests on the bottom ledge 180. When in use, the inventory control collar locking ring 10 is positioned around the cylindrical neck 1010 of the gas cylinder 1000 and on top of the previously installed inventory control collar 100. The locking ring 10 is sized to be received on a locking surface 110 in the inventory control collar 100 to secure the inventory control collar 100 on the storage container 1000. A plurality of inwardly disposed flexible tabs 16 are equally spaced around the inside perimeter of the central opening 14 for engagement of the neck 1010 of the gas cylinder 1000. It will be appreciated that the tabs 16 provide an interference fit with the cylinder neck 1010 upon installation of the locking ring 10 over the inventory control collar.

As best illustrated in FIG. 6A the polymeric collar housing 120 has a truncated conal exterior shape with a knee 121 projecting from the exterior circumference. The knee 121 contains the memory 200. A first conductive ring 150 and a second conductive ring 160 are seated in a groove 130 in the top of the collar housing 120. An insulating retainer ring 140 is inserted from the top between the first conductive ring 150 and the second conductive ring 160. The conductive ring 150 begins at the knee 121 and extends circumferentially around the top of the collar housing 120 and terminates in a down-turned portion 151 at the knee 121. Likewise, the second ring 160 begins at the knee 121 and extends circumferentially around the top of the collar housing 120 and terminates in a down-turned portion 161 at the knee 121. The retainer ring 140 begins at the knee 121 and extends circumferentially around the collar housing 120 and terminates at a knee cover 141 (FIG. 6) which is formed integrally with the retainer ring 140. The down-turned portions 151 of the first conductive ring 150 is connected to a first contact terminal (not shown) of the memory 200. Similarly, the down-turned portion of the second conductive ring 160 is connected to a second contact terminal (not shown) of the memory 200.

Figure 7:
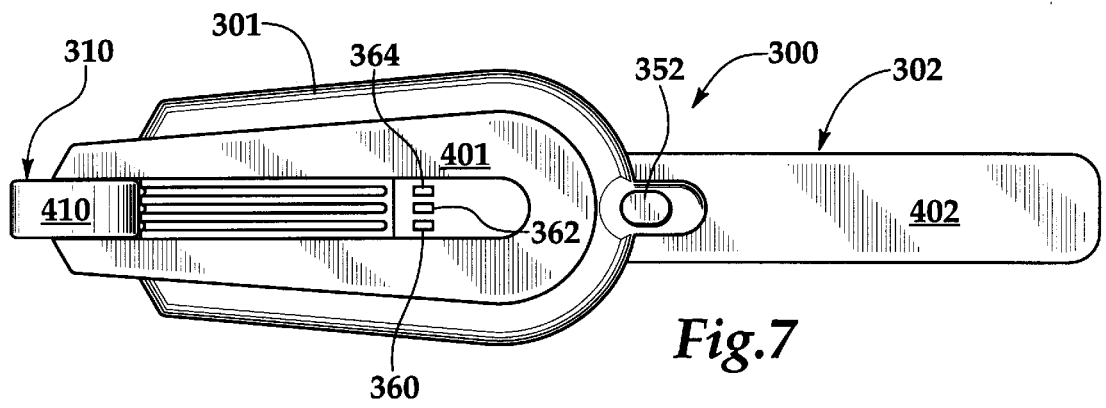
FIG. 7 is a top view of the inventory control probe (data read/write device) used in connection with the present invention.
Figures 8, 9:
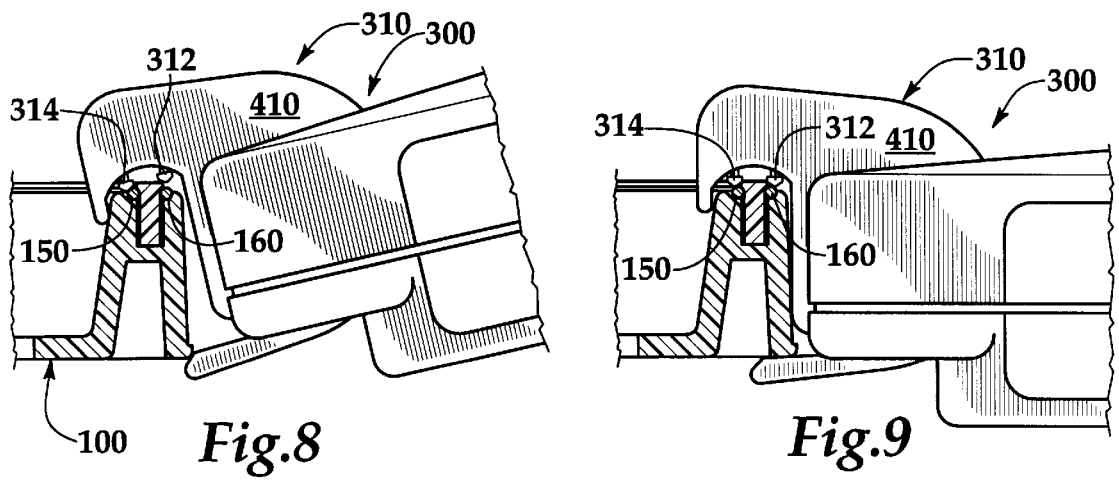
FIGS. 8 and 9 are partial cut-away views of a portion of an inventory control probe engaging the inventory control collar.

Referring now to FIGS. 7–9, there is illustrated a hand-held inventory control probe 300 (data read/write device) suitable for use in connection with the invention. The probe comprises three general sections: an elongated body section 301, a probe tip 310 attached to a first end of the body section, and a handle 302 removably attached to the second end of the body section 301. The probe body section 301 has a corresponding housing 401, the handle 302 has a corresponding housing 402 and the probe tip 310 has a corresponding housing 410.

As best illustrated in FIGS. 8 and 9 the probe tip housing 410 of the inventory control probe 300 is generally "C" shaped. Disposed on the inner side of the top of the "C" of the probe tip housing 410 are terminal tips 312 and 314 for transmitting data to and reading data from a memory of the inventory control collar 100 (FIGS. 6 and 6A) by contacting the conductive rings 150 and 160 exposed on the upper surface of the inventory control collar. The lower portion of the "C" shaped probe tip housing 410 assists in grasping and securing the probe tip 310 to the inventory control collar 100 during data transmission.

As illustrated in FIG. 7, the inventory control probe 300 includes an operating switch (not shown) that is activated by a button 352 disposed on the top of the housing 401. Also located on the top of the housing 401 are a plurality of LEDs 360, 362 and 364 for indicating various conditions. For example, LED 360 indicates when proper contact is achieved between the probe tip contacts 314 and 312 and the collar conductor rings 150 and 160.

Referring now to FIGS. 8 and 9, data is written and read from the inventory control collar 100 with the inventory control probe 300 by concurrently touching the probe tip 310, having terminal tips 312 and 314 to the conductive rings 150 and 160 exposed on the upper surface of the inventory control collar 100. Data is transmitted through the conductive rings 150 and 160 to and from the memory 200.

FIGS. 10 and 11, illustrate a control module 500 and a docking station 700 (data read/write device). The control module 500 and docking station 700 work in concert to perform inventory control management. A "C" shaped collar clip 710 (see FIG. 10) is a part of the docking station for attachment to the inventory control collar 100 in the same manner as probe tip 310. The collar clip 710 includes contacts 712 and 714 that engage the conductive rings 150 and 160 (FIG. 6A) exposed on the upper surface of the inventory control collar 100. The lower portion of the collar clip 710 aids in securing the collar clip to the inventory control collar 100 during data transmission.

Collar clip 710 includes an interconnecting line 711 that connects the collar clip with the docking station 700. The control module 500 includes contacts (not shown) on the housing bottom that mate with corresponding contacts disposed on the top of the docking station 700. When in the docked position, the control module 500 operates to transmit and receive data from an inventory control collar 100 or a data tag (not shown) in the same manner as the self-contained inventory control probe 300. A plurality of LEDs 560, 562 and 564 indicate the status of various functions in the control module.

Turning now to FIG. 12, the operation of the gas cylinder monitoring system of the present invention is further illustrated. A gas cylinder 1020 is positioned in a cylinder cabinet 1040. A locking device 1060 secures the door 1030 of the cylinder cabinet in a locked position during normal operations. The cylinder cabinet is also provided with a cylinder cabinet controller 1050 that controls the operation of the cylinder cabinet locking device 1060. The cylinder cabinet controller also interfaces with the docking station 700 and the control module 500.

The control module 500 is preprogrammed to permit the cylinder cabinet controller to actuate the locking device and unlock the cylinder cabinet for cylinder replacement only if the information recorded in the memory of the inventory collar 100 indicates that the replacement cylinder contains the correct gas. Alternatively, the control module 500 is preprogrammed to access the host computer 800 to determine the correct type of process gas to be used at the particular location and allow the cabinet to be unlocked only if connected to an inventory control collar installed on a cylinder containing the correct type of gas.

When the cylinder 1020 needs to be replaced either because the supply of gas in the cylinder is depleted, or for some other reason, a replacement cylinder (not shown) with an inventory control collar 100 is positioned at a location where the docking station 700 can be connected to the inventory control collar 100 installed on the replacement cylinder. Collar clip 710 (FIG. 10) is attached to the inventory control collar of the replacement cylinder and the control module 500 receives data, including the type of gas contained in the cylinder, from the inventory control collar. If the replacement cylinder contains the correct type of gas, the control module 500 interfaces with the cabinet controller 1050 to allow the cylinder cabinet 1040 to be opened. If the replacement cylinder does not contain the correct type of gas, the control module 500 will not allow the cabinet controller 1050 to actuate the locking device 1060 to unlock the cylinder cabinet 1040. Additionally, control module 500 is programmed to cause an alarm, either locally, or through the host computer 800 in the event that there is an attempt to install a cylinder containing the wrong type of gas at the particular location.

Referring to FIG. 12, the gas cylinder 1020 is positioned in the cylinder cabinet 1040 on top of weight scale 1070. The scale 1070 is electronically coupled to the inventory control collar 100 to continuously or periodically transmit and record the weight of a cylinder 1020 for inventory control purposes. When the inventory control collar 100 is accessed by an inventory control probe 300 or a control module 500 the weight of the gas cylinder 1020 is transmitted and recorded. The weight of the cylinder 1020 is then transmitted to the host computer 800. The host computer 800 is programmed to compare the transmitted weight of the gas cylinder 1020 to a preselected value, for example the weight of the cylinder when 95% of the gas is depleted, and automatically schedule the cylinder for replacement or otherwise indicate that the cylinder needs to be replaced. Alternatively, the host computer 800 is preprogrammed to indicate to an operator that the cylinder needs replacement. Additionally, control module 500 or host computer 800 is programmed to compute and display the rate at which the gas in the cylinder is being used and cause an alarm in the event that the rate of gas consumption varies outside of preselected limits.

The automated gas cylinder monitoring system of the present invention also includes a leak detection and alarm function. As illustrated in FIG. 12 gas cylinder cabinet 1040 is equipped with a gas monitor 1045 electronically coupled to a control module 500 through a docking station 700. In the event that the gas monitor 1045 detects the presence of process gas in the cabinet, a signal is transmitted to the control module 500 to transmit a signal to the host computer 800. Upon receiving the signal, the host computer 800 activates an alarm indicating the presence of process gas in the cabinet.

Turning now to FIG. 13, process gas from a gas cylinder 1020 flows through a gas supply line 1080. A flowmeter 1090 measures the flow rate of the process gas from the cylinder 1020. The flowmeter 1090 is equipped with an integrator 1100 to record the total amount of gas flowing from the cylinder during a given time period or over the supply cycle of the cylinder. The flowmeter 1090 is electronically coupled to an inventory control collar 100 to continuously or periodically transmit and record the flow rate of the process gas from the cylinder 1020 and/or the total flow over a selected period of time.

When the inventory control collar 100 is accessed by an inventory control probe 300 or a control module 500 the flow rate of the process gas from the cylinder 1020 and/or the total flow over a selected period of time is transmitted and recorded. The instantaneous flow rate and/or the total flow from the cylinder 1020 is then transmitted to the host computer 800. The host computer 800 is programmed to compare the instantaneous flow rate and/or total flow preselected values, for example the predicted instantaneous flow rate based on the particular process and the theoretical volume of gas in the cylinder. The host computer is programmed to use the flow rate information to predict when the supply of gas in the cylinder will be depleted and automatically schedule the cylinder for refilling or replacement or otherwise indicate that the cylinder needs to be replaced. Alternatively, the host computer 800 is preprogrammed to indicate to an operator that the cylinder needs to be replaced or refilled when the information is transmitted. The control module 500 or host computer 800 is also programmed to cause an alarm in the event that the flow rate varies outside of preselected limits.

Referring to FIG. 13, process gas is supplied from the gas cylinder 1020 through a supply line 1080. A pressure gauge 1110 measures the pressure of the process gas flowing from cylinder 1020. As illustrated, the pressure gauge 1110 is connected to the supply line 1080, however, it is contemplated that pressure gauge may be connected directly to the gas cylinder 1020. The pressure gauge 1110 is electronically coupled to an inventory control collar 100 to continuously or periodically transmit and record the process gas pressure.

When the inventory control collar 100 is accessed by either a inventory control probe 300 or a control module 500 the process gas pressure is transmitted and recorded. The process gas pressure may then be transmitted to host computer 800. The host computer 800 is programmed to compare the process gas pressure to a preselected value to determine whether the cylinder needs to be replaced. Alternatively, the host computer 800 is preprogrammed to indicate to an operator that the cylinder needs replacement based upon the process gas pressure. The control module 500 or host computer 800 is also be programmed to cause an alarm in the event that the process gas pressure varies outside of preselected limits.

Although various embodiments of the present invention have been illustrated in the accompanying Drawings and described in the foregoing Detailed Description, it will be understood that the invention is not limited to the embodiments disclosed but as will be appreciated by those skilled in the art, the invention is susceptible to numerous modifications and variations without departing from the spirit and scope of the invention as hereinafter claimed.

We claim:

1. An automated gas cylinder monitoring system, comprising:
   a data storage device mounted to a gas cylinder, the data storage device including a resident memory and a housing, the housing having a configuration for mounting to a gas cylinder;
   a read/write device for accessing information stored in the resident memory of said data storage device;
   a measuring device electronically coupled to the data storage device, the measuring device monitoring a physical characteristic of the gas cylinder and transmitting data reflecting the recorded characteristic to the data storage device, the data storage device retaining information relating to the physical characteristic; and
   a host computer for transmitting information to and receiving information from the read/write device.

2. The automated gas cylinder monitoring system of claim 1, wherein the measuring device further comprises a scale for generating information for access by the read/write device relating to the weight of gas in the cylinder.

3. The automated gas cylinder monitoring system of claim 1, wherein the measuring device further comprises a flow meter for generating information for access by the read/write device relating to the flow of gas from the gas cylinder.

4. The automated gas cylinder monitoring system of claim 1, wherein the measuring device further comprises a pressure gauge for generating information for access by the read/write device relating to the pressure of the gas contained in the cylinder.

5. The automated gas cylinder monitoring system of claim 1, wherein the measuring device further comprises a gas monitor for generating information for access by the read/write device relating to leakage of the gas contained in the cylinder.

6. The automated gas cylinder monitoring system of claim 1 wherein the host computer includes a program for generating a cylinder replacement schedule based on information transmitted from the read/write device.

7. The automated gas cylinder monitoring system of claim 1 wherein said read/write device for accessing information stored in the resident memory of said data storage means comprises a docking station and control module.

8. The automated gas cylinder monitoring system of claim 1 wherein said read/write device for accessing information stored in the resident memory of said data storage device comprises an inventory control probe.

9. The automated gas cylinder monitoring system of claim 1 wherein the data storage device mounted to the gas cylinder further comprises an inventory control collar including the resident memory and a housing configured for attachment to the neck of a gas cylinder.

10. The automated gas cylinder monitoring system of claim 1, wherein the read/write device further comprises a portable probe capable of directly accessing information stored in the resident memory of said data storage device upon removal of the gas cylinder from the system with the data storage device mounted thereon.

11. The automated gas cylinder monitoring system of claim 1, further comprising:
   a lockable gas cylinder cabinet in which the data storage device and gas cylinder are storable and in which the measuring device is deployed for connection to the gas cylinder; and
   a docking station electrically coupled to the data storage device when the gas cylinder is in the cabinet, wherein the docking station is disposed outside the cabinet, the probe accessing information stored in the resident memory of said data storage device indirectly upon interfacing with the docking station when the cabinet is locked.

12. The automated gas cylinder monitoring system of claim 11, further comprising:

a cabinet controller, a cabinet locking device, the cabinet controller electronically coupled to the cabinet locking device;

the cabinet controller selectively connectable to a replacement cylinder through the data storage device mounted on the replacement cylinder;

the cabinet controller actuating the cabinet locking device to unlock the cabinet for replacement of the gas cylinder in the cabinet.

13. An inventory control system comprising:

a data storage device including a circular housing configured for mounting on a gas cylinder, the data storage device having first and second conductive rings exposed on the top of the housing, the second conductive ring spaced from the first ring;

a resident memory contained in the housing for storing information relating the gas cylinder;

a read/write device for writing data to and reading data from the resident memory of the data storage device;

a measuring device electronically coupled to the data storage device, the measuring device monitoring a physical characteristic of the gas cylinder and transmitting data reflecting the recorded characteristic to the data storage device, the data storage device retaining information relating to the physical characteristic;

a host computer for transmitting data to and receiving data from the read/write means; and, a workstation coupled to the host computer for displaying information retrieved from the data storage device.

14. The inventory control system of claim 13 wherein the measuring device generates a signal relating to the volume of gas in the cylinder.

15. The inventory control system of claim 13 wherein the measuring device comprises a scale for generating a signal proportional to the weight to the cylinder.

16. The inventory control system of claim 13 wherein the measuring device comprises a flow meter responsive to the flow of gas from the gas cylinder and generating a signal varying therewith.

17. The inventory control system of claim 13 wherein the measuring device comprises a pressure gauge for monitoring the pressure of the gas contained in the cylinder and generating a signal varying therewith.

18. The inventory control system of claim 13 wherein the read/write device further comprises a portable probe capable of directly accessing information stored in the resident memory of said data storage device upon removal of the gas cylinder from the system with the data storage device mounted thereon.

19. The inventory control system of claim 13 wherein the read/write device comprises an inventory control probe adapted for transferring data to and from the data storage device, the inventory control probe comprising:

a probe tip;

an elongated body section;

a pair of contact pins disposed on the probe tip configured to concurrently contact the conductive rings of the data storage device when the probe tip is engaged with the housing; and a handle connected at a second end to the probe body housing remote from the probe tip, the handle having a configuration suitable for hand placement of the probe into engagement with the collar.

20. An inventory control system comprising:

an inventory control module;

a docking station for transferring data and program instructions to and from the inventory control module;

a data storage device for use on a gas cylinder, the data storage device comprising an inventory control collar having a first conductive ring exposed on a top of the collar and electrically connected to a resident memory and a second conductive ring exposed on the top of the collar and electrically connected to the resident memory, the docking station further comprising:

a collar clip;

a first pair of contact pins disposed on a collar clip at a predetermined distance apart such that the contact pins may simultaneously contact the conductive rings of the inventory control collar when the collar clip is clipped onto the inventory control collar; and a measuring device electronically coupled to the data storage device, the measuring device monitoring a physical characteristic of the gas cylinder and transmitting data reflecting the recorded characteristic to the data storage device, the data storage device retaining information relating to the physical characteristic.

* * * * *